United States Patent
Binkert et al.

(10) Patent No.: US 8,942,559 B2
(45) Date of Patent: Jan. 27, 2015

(54) SWITCHING IN A NETWORK DEVICE

(75) Inventors: Nathan Binkert, Redwood City, CA (US); Moray McLaren, Stoke Gifford Bristol (GB); Michael Tan, Palo Alto, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 141 days.

(21) Appl. No.: 13/696,631

(22) PCT Filed: May 20, 2010

(86) PCT No.: PCT/US2010/035661
§ 371 (c)(1),
(2), (4) Date: Jan. 22, 2013

(87) PCT Pub. No.: WO2011/146066
PCT Pub. Date: Nov. 24, 2011

(65) Prior Publication Data
US 2013/0266309 A1 Oct. 10, 2013

(51) Int. Cl.
*H04J 14/00* (2006.01)
*H04L 12/24* (2006.01)
(Continued)

(52) U.S. Cl.
CPC .......... *H04L 41/0826* (2013.01); *H04L 49/253* (2013.01); *H04L 49/30* (2013.01); *H04L 49/40* (2013.01)
USPC ................... 398/51; 398/45; 398/54; 398/56; 398/79; 398/48; 385/24; 385/16; 385/17; 385/18; 370/392; 370/389; 370/351; 370/254; 370/228

(58) Field of Classification Search
CPC .............. H04J 14/0267; H04J 14/0268; H04J 14/0269; H04J 14/0271; H04J 14/0287; H04J 14/0289; H04J 14/029; H04J 14/0291; H04J 14/0293; H04J 14/0294; H04J 14/0297; H04J 14/0295
USPC ........... 398/45, 46, 48, 47, 49, 51, 54, 19, 33, 398/79, 83, 58, 59, 55, 56, 57; 385/24, 16, 385/17, 18; 370/360, 392, 389, 401, 216, 370/252, 228, 225, 400, 351
See application file for complete search history.

(56) References Cited

U.S. PATENT DOCUMENTS 6,111,880 A   8/2000  Rusu et al.
6,807,167 B1  10/2004 Chakrabarti et al.
(Continued)

FOREIGN PATENT DOCUMENTS

EP   1357690      10/2003
EP   13576970 A1  10/2003

OTHER PUBLICATIONS

"Cisco MGX 8850/B Advanced ATM Multiservice Switch" ~ Public Information ~ 1992-2007 ~ pp. 6.
(Continued)

*Primary Examiner* — Hanh Phan

(57) ABSTRACT

As described herein, a network device includes an optical circuit switch to perform circuit switching. The network device also has a plurality of removable line cards, each of which includes a packet switch. A switching manager automatically reconfigures the optical circuit switch based on a configuration of the removable line cards to maintain a guaranteed packet switching bandwidth between active line cards.

19 Claims, 4 Drawing Sheets

(51) Int. Cl.
*H04L 12/937* (2013.01)
*H04L 12/935* (2013.01)
*H04L 12/931* (2013.01)

(56) References Cited

U.S. PATENT DOCUMENTS

| | | |
|---|---|---|
| 7,023,856 B1 | 4/2006 | Washabaugh et al. |
| 7,266,110 B1 | 9/2007 | Cao et al. |
| 7,317,873 B2 * | 1/2008 | Aoki ................................ 398/45 |
| 7,330,467 B2 * | 2/2008 | Sharma ........................ 370/360 |
| 7,406,518 B2 | 7/2008 | Lasserre |
| 2002/0097672 A1 * | 7/2002 | Barbas et al. ................. 370/216 |
| 2003/0039014 A1 | 2/2003 | English |
| 2003/0072480 A1 | 4/2003 | Tsujii |
| 2003/0163555 A1 | 8/2003 | Battou et al. |
| 2005/0108401 A1 | 5/2005 | Gonda |
| 2005/0169281 A1 | 8/2005 | Ko et al. |
| 2005/0243842 A1 | 11/2005 | Waitzmann |
| 2006/0072480 A1 | 4/2006 | Deval et al. |
| 2008/0315985 A1 | 12/2008 | Johnsen et al. |

OTHER PUBLICATIONS

PCT Search Report/Written Opinion ~ PCT /US2010/035661 dated Feb. 8, 2011.

* cited by examiner

SWITCHING IN A NETWORK DEVICE

CROSS-REFERENCE TO RELATED APPLICATION

This application is a national stage application under 35 U.S.C. §371 of PCT/US2010/035661, filed May 29, 2010.

BACKGROUND

Various types of network switches (e.g., large Ethernet switches) include several slots which can be populated with line cards. These slots can be populated in various combinations. Line cards can be inserted or removed at run time and any line card can fail at any time. Network operators/administrators are typically responsible for maintaining network operability in view of a line card failure, addition, and/or removal.

BRIEF DESCRIPTION OF DRAWINGS

The following description includes discussion of figures having illustrations given by way of example of implementations of embodiments of the invention.

DETAILED DESCRIPTION

Network devices with multiple slots available for population by line cards may employ the use of a number of centralized packet switch chips (e.g., located on fabric cards or mounted on the backplane of the network device). Each port on a switch chip may be hardwired to one of the slots on the network device. As such, ports on the switch chips are dedicated to respective slots and the switch chips can turn on and off those ports depending on whether a particular slot is populated with a functioning/active line card or not. As used herein, a line card refers to one or more electronic circuits on a printed circuit board that interface telecommunication lines coming from subscribers to other parts of a telecommunications network.

In general, a switch refers to a network bridge that processes and routes data at the data link layer (layer 2) of the OSI (Open Systems Interconnect) model. Switches that additionally process data at the network layer (layer 3 of the OSI model) are frequently referred to as Layer 3 switches, routers or multilayer switches. As used herein, a switch may refer to a Layer 2 bridge or a Layer 3 router. A network switch, as used herein, refers more generally to a networking device that connects network segments.

The centralized packet switch chips described above may use packet switching (e.g., as opposed to circuit switching) to facilitate the use of packets with the network device. Such switch chips are often expensive and are maximally utilized when all slots are populated with line cards. Thus, the purchaser of a partially populated switch pays for functionality that may never be used.

Embodiments described herein incorporate packet switching functionality directly on the line cards within a network device. Packet switching is then implemented within the context of a dynamically reconfigurable optical circuit switching framework.

Figure 1:
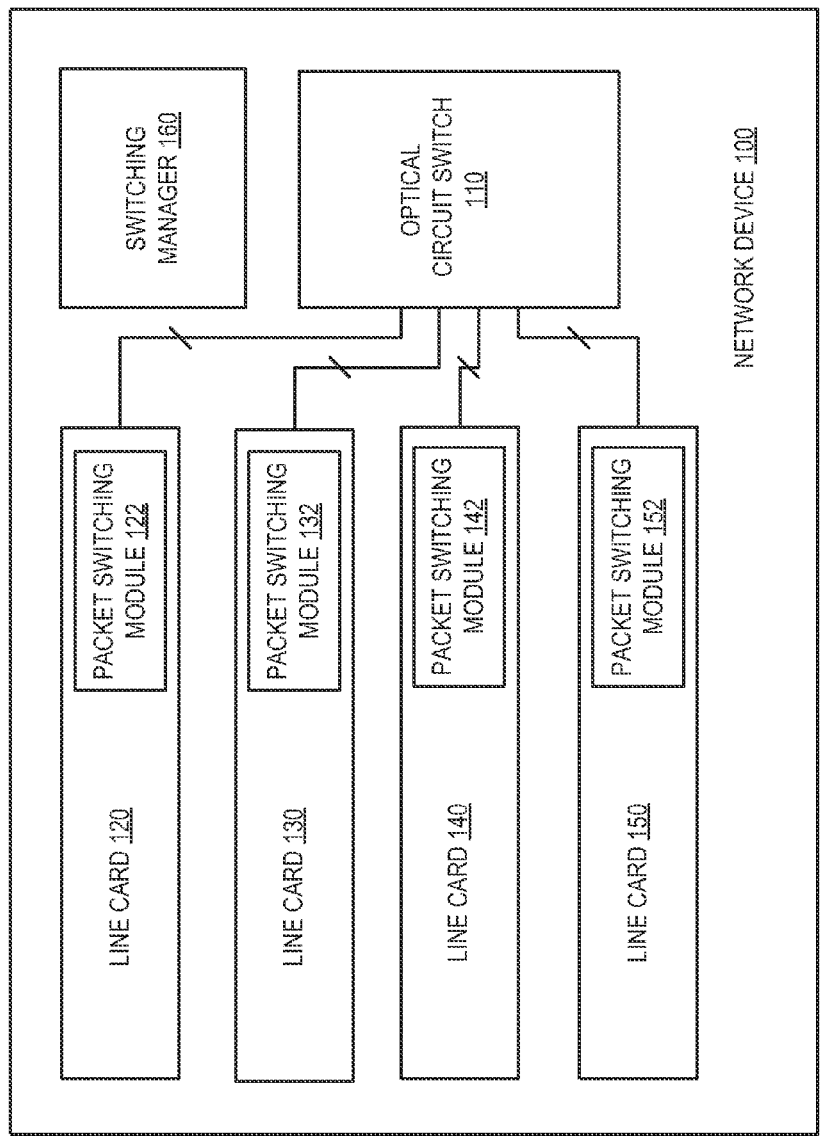
FIG. 1 is a block diagram illustrating a network device according to various embodiments.

FIG. 1 is a block diagram illustrating a network device according to various embodiments. As shown, network device 100 includes a centralized circuit switch 110 connected to a plurality of line cards 120-150. The number of line cards illustrated in FIG. 1 is merely an example of various embodiments; more line cards or fewer line cards could be employed in different embodiments. It should also be noted that the number of line cards illustrated does not necessarily equal the number of line card slots on network device 100. In other words, the four illustrated line cards may only occupy a subset of available slots in network device 100. In general, network device 100 may be an Ethernet switch or other suitable device for routing packet traffic.

Line cards 120-150 each have a packet switching module 122-152, respectively. Packet switching modules 122-152 can be implemented as one or more hardware modules, special-purpose hardware (e.g., application specific hardware, application specific integrated circuits (ASICs), embedded controllers, hardwired circuitry, etc.), software modules or some combination of these. As the name implies, packet switching modules 122-152 perform packet switching. As used herein, packet switching refers to delivery of variable-bit-rate data streams (i.e., sequences of packets) over a network. In various embodiments, each packet switching module is capable of routing packets on behalf of other packet switching modules on network device 100. For example, packet switching modules 122-152 could each route packets using a universal routing scheme such as the routing scheme proposed by Valiant (L. G. Valiant. *A scheme for fast parallel communication. SIAM Journal on Computing,* 11(2):350-361, 1982).

Each of line cards 120-150 is connected to circuit switch 110. As shown, each line card includes multiple links (e.g. bi-directional links) to circuit switch 110. While the specific number of links from each line card may vary, various embodiments include at least a plurality of links to provide a level of redundancy.

In various embodiments, circuit switch 110 is an optical circuit switch. In general, a circuit switch refers to a switch that establishes a circuit or channel between network nodes, as if the nodes were physically connected with an electrical circuit. Accordingly, an optical circuit switch, as used herein, refers a circuit switch that uses optical signals and links for communication. Below is an example of how an optical circuit switch might be constructed. Other suitable optical circuit switch(es) and/or optical switching framework could be used in various embodiments described herein.

Waveguides (e.g., hollow metal, polymer core, etc.) may be formed in a backplane to create an optical crossbar framework. For example, a first group of parallel crossbars may be bus lines which traverse the length of the backplane, while a second group of parallel crossbars may be tap lines which intersect the bus lines and are connected to a computing element.

An optical element or combination of optical elements may be placed in each intersection to selectively direct optical signals from the bus lines into the tap lines and vice versa. These optical elements may include prisms, mirrors, light valves and other optical elements. The optical elements may be dynamic or passive. At least one of the optical elements in the intersection may change state to switch the interconnection from a through state to a crossed state.

Computing elements are connected to the optical crossbar framework. For example, a primary computing device or network may be connected to the bus lines and a number of other computing devices may be connected to the tap lines. Bus lines may be connected to a larger computing network or router and the tap lines may be connected to a number of blade computer elements. Each of the blade computer elements may be connected to multiple tap lines. Computing devices may use more or less tap lines for bidirectional communication. Additionally, the computing device may use wavelength division multiplexing for bidirectional communication over a given line set.

As discussed above, the bus ports may be connected in a variety of locations along the bus lines. In some embodiments, it may be advantageous to locate the bus ports at one end of the bus lines. In other embodiments, buses ports may be attached to the center of the bus lines and distribute optical signals in both directions through the bus lines. In general, the location of the bus ports on the bus lines can be determined by a number of factors including: space constraints, connection constraints, optical loss budgeting, or other relevant criteria.

Optical elements can be dynamically switched within the optical crossbar framework to connect desired tap lines to the bus lines. For example, dynamically switching the optical elements may include separately switching a number of individual elements or moving a block of elements with a single actuator. By way of example and not limitation, this switching may include moving a solid periscope prism into the path of a bus line, tilting mirror into the path of a bus line, or opening a light valve to allow passage of optical signals from a bus line into a tap line.

Optical signals are directed between the tap lines and bus lines. For example, the optical signal from multiple tap lines may be connected to a single bus line using a series of combiner elements. Additionally or alternatively, a single tap line may be simultaneously connected to two or more bus lines.

In some embodiments, optical circuit switch 110 is a single centralized circuit switch. In other embodiments, optical circuit switch 110 is comprised of several smaller circuit switches connected via optical links. In such embodiments, circuit switch 100 may be distributed, for example, among active line cards (see, e.g., FIG. 3). In other words, in addition to each line card having a packet switching module, each line card (or at least some of the line cards) may have a circuit switching module. Distributed circuit switching modules may be controlled to act in concert as a single circuit switch, as described in more detail below.

Switching manager 160 adaptively reconfigures optical circuit switch 110 based on the configuration of line cards on network device 100. In other words, switching manager monitors line card slots on network device 100 and determines which slots are populated with active line cards. Based on the active line card configuration, switching manager 160 adaptively configures circuit switch 110 to scale packet switching bandwidth accordingly. Switching manager 160 can be implemented as one or more hardware modules, special-purpose hardware (e.g., application specific hardware, application specific integrated circuits (ASICs), embedded controllers, hardwired circuitry, etc.), software modules or some combination of these.

At the direction of switching manager 160, optical circuit switch 110 (as opposed to, for example packet switching modules 122-152) handles link redundancies and/or link failures for network device 100. For example, if a link fails, switching manager 160 reconfigures optical circuit switch 110 to compensate for the link failure and maintain maximum bandwidth on the remaining active links. While switching manager 160 directs, calculates and/or determines the reconfiguration of optical circuit switch 110, it is optical circuit switch 110 that ultimately carries out the circuit switched communications.

Figure 2:
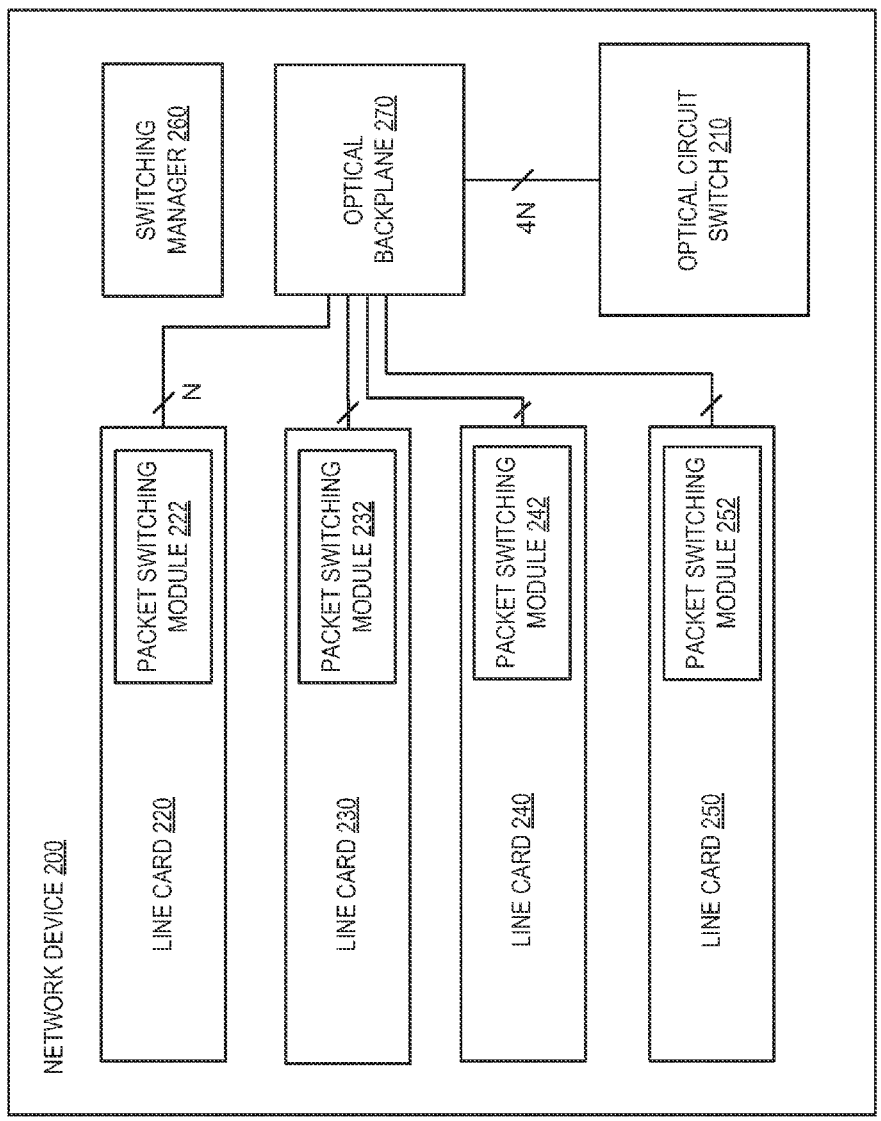
FIG. 2 is a block diagram illustrating a network device according to various embodiments.

FIG. 2 is a block diagram illustrating a system according to various embodiments. Similar to FIG. 1, network device 200 includes various removable line cards 220-250, a optical backplane 270, an optical circuit switch 210, and a switching manager 260. As with embodiments described above, circuit switch 210 may be an optical circuit switch that is distributed, for example, among line cards via optical links.

As shown, line cards 220-250 are connected to optical circuit switch 210 via optical backplane 270. In various embodiments, optical backplane 270 may be a passive optical backplane, which offers no active bus driving circuitry but is not considered a single point of failure for on the network.

Optical circuit switch 210 is configurable (e.g., via switching manager 260) to connect one line card to another line card at a full-bandwidth rate (perhaps via intermediate switches). With conventional, centralized packet switching, centralized packet switches may be over-provisioned to maintain full-bandwidth connections. By establishing the optical circuit switching framework of circuit switch 210, packet switching modules 222-252 can be guaranteed full-bandwidth connections with normal provisioning.

Additionally, centralized packet switches are often hardwired to each line card. Conversely, in various embodiments described herein, if one of line cards 220-250 is removed, switching manager 260 reconfigures the circuit switching framework of circuit switch 210 to maintain guaranteed packet switching bandwidth between the remaining active line cards. Circuit switch 210 also handles link failure and link redundancy via switching manager 260. In various embodiments, switching manager 260 is implemented as a management processor. In other embodiments, switching manager 260 may be implemented as one or more hardware modules, special-purpose hardware (e.g., application specific hardware, application specific integrated circuits (ASICs), embedded controllers, hardwired circuitry, etc.), software modules or some combination of these.

Figure 3:
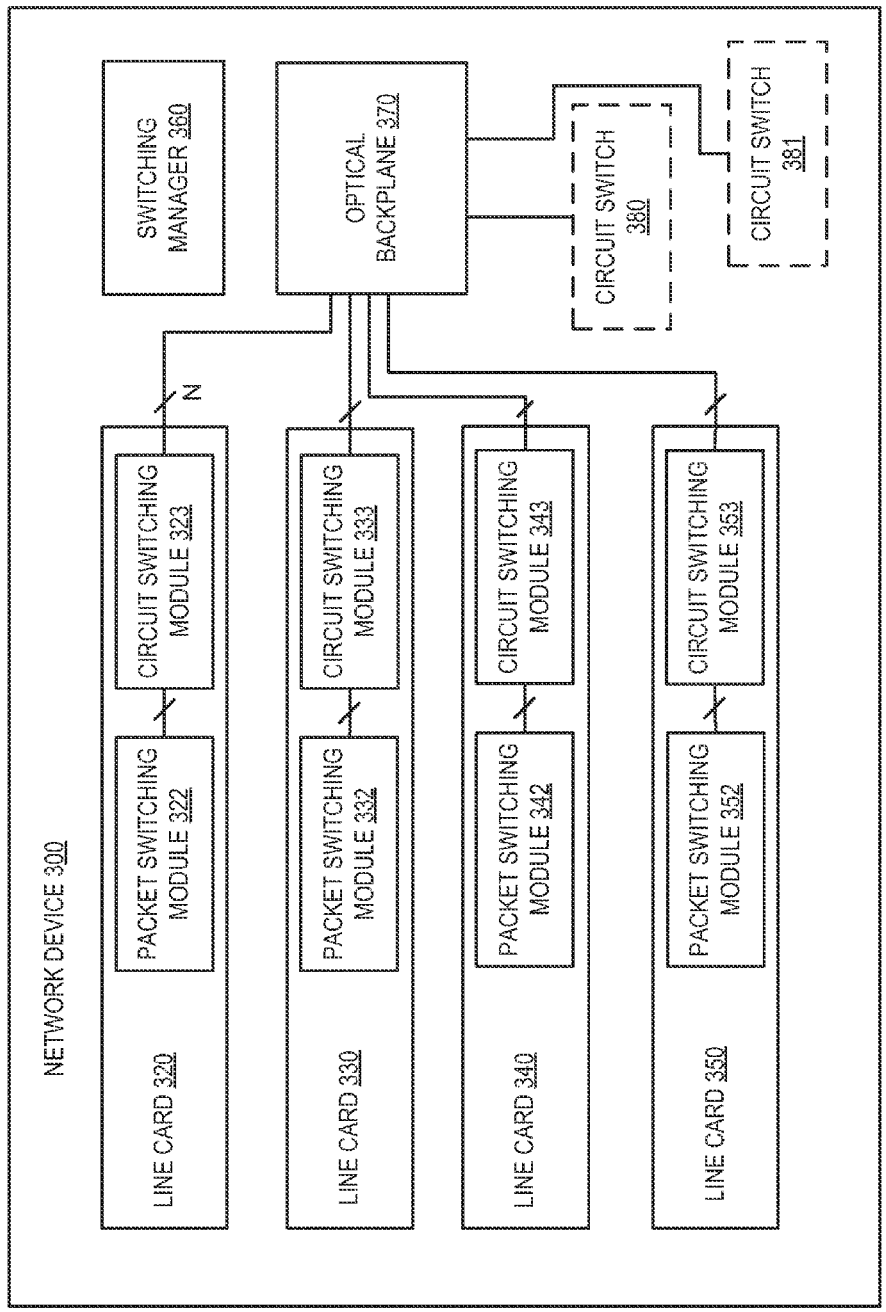
FIG. 3 is a block diagram illustrating a network device according to various embodiments.

FIG. 3 is a block diagram illustrating a network device according to various embodiments. In particular, network device 300 illustrates a distributed optical circuit switch. The distributed optical circuit switch is at least distributed across line cards 320-350, which are all optically connected to optical backplane 370. In certain embodiments, the distributed circuit switch may additionally include independent circuit switch 380 and/or circuit switch 381. In other words, various combination of circuit switching modules on line cards and independent circuit switches can be combined to form an overall optical circuit switch. The optical circuit switching functionality is controlled and managed by switching manager 360. If one or more line cards fail, a particular link fails, or other event occurs, switching manager 360 reconfigures the overall optical circuit switch by coordinating changes to the various optical circuit switching modules 323-353, circuit switches 380-381, and/or optical backplane 370. As with other embodiments, switching manager 360 may be implemented as one or more hardware modules, special-purpose hardware (e.g., application specific hardware, application specific integrated circuits (ASICs), embedded controllers, hardwired circuitry, etc.), software modules or some combination of these.

Figure 4:
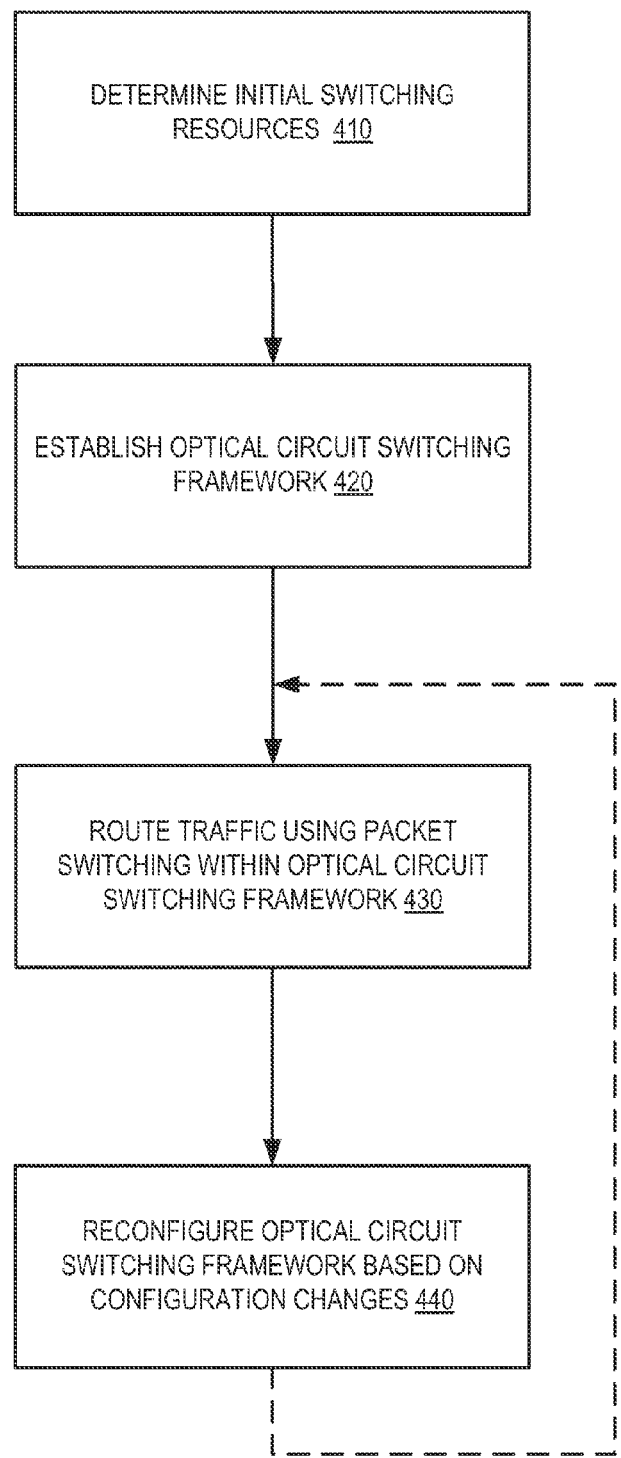
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

Initial switching resources are determined 410. For example, a switching manager on a network device may determine which slots have active line cards, which line cards have optical circuit switching modules and any other switching resources (e.g., packet switching modules) on the network device. Based on the available resources, an optical circuit switching framework is established 410 for the device. In particular, the optical circuit switching framework is established on the network device in view of the active (and removable) line cards installed in the network device. The optical circuit switching framework is configured to maximize packet switching functionality (e.g., packet switching modules) included on each of the active line cards.

Accordingly, traffic is routed 430 through the network device via packet switching on the removable line cards. Packet switching is performed within the bounds of the optical circuit switching framework. In other words, the optical circuit switching framework defines (at least logically) the network topology of the network device. Given that topology, packet switches on the line cards operate to route packets via packet switching in view of the topology.

When a link status event (e.g., a link failure, line card insertion, line card removal, etc.) is detected, the event is automatically resolved. For example, if the configuration of the line cards changes, the optical circuit switching framework is automatically reconfigured 440 (e.g., via a switching manager) to maintain link redundancy and guaranteed packet switching bandwidth among active line cards. The guaranteed packet switching bandwidth may be a full-bandwidth guarantee or a guarantee of something less than full-bandwidth.

Various components, modules, etc. described herein may be a means for performing associated functions, operations, etc.

The invention claimed is:

1. A network device, comprising:
   an optical circuit switch to perform circuit switching;
   a plurality of removable line cards, each having a packet switch; and
   a switching manager to adaptively reconfigure the optical circuit switch based on a configuration of the removable line cards to maintain a guaranteed packet switching bandwidth between active line cards.

2. The network device of claim 1, wherein the optical circuit switch is distributed among the active line cards.

3. The network device of claim 1, wherein each line card is capable of routing packets on behalf of other line cards.

4. The network device of claim 1, the optical circuit switch further to handle at least one of:
   link redundancy on a network;
   link failure on the network.

5. The network device of claim 1, wherein each line card is further connected to a passive optical backplane via the optical circuit switch.

6. The network device of claim 1, wherein the network device is an Ethernet switch.

7. The network device of claim 1, wherein the optical circuit switch is to perform the circuit switching by establishing a circuit including optical lines and optical elements between network nodes, and communicating optical signals over the circuit, and
   wherein the packet switch of each of the removable line cards is to perform routing of packets.

8. The network device of claim 1, wherein the adaptive reconfiguring of the optical circuit switch is to maintain the guaranteed packet switching bandwidth between the active line cards of the removable line cards through the optical circuit switch.

9. The network device of claim 1, wherein the optical circuit switch is to connect one of the active line cards to another of the active line cards.

10. The network device of claim 1, wherein the switching manager is to adaptively reconfigure the optical circuit switch in response to addition of a line card to or removal of a line card from a slot of the network device.

11. A method, comprising:
    establishing an optical circuit switching framework using at least one optical circuit switch on a network, the optical circuit switch to perform circuit switching of optical signals;
    routing traffic on the network via removable line cards that each includes a packet switch performing packet switching within bounds of the optical circuit switching framework; and
    automatically reconfiguring the at least one optical circuit switch based on a change in configuration of the removable line cards, the reconfiguring to maintain a guaranteed packet switching bandwidth between active line cards of the removable line cards through the at least one optical circuit switch.

12. The method of claim 11, further comprising:
    distributing the optical switching framework among the active line cards.

13. The method of claim 11, wherein the routing of traffic further comprises:
    an active line card routing packets on behalf of another active line card.

14. The method of claim 11, further comprising:
    the optical circuit switching framework detecting a link status event; and
    automatically resolving the link status event.

15. The method of claim 14, wherein a link status event comprises one or more of:
    a link failure;
    a packet switch failure.

16. The method of claim 11, wherein the optical circuit switch performs the circuit switching by establishing a circuit including optical lines and optical elements between network nodes, and communicating the optical signals over the circuit, and
    wherein the packet switch of each of the removable line cards performs routing of packets.

17. The method of claim 11, wherein the at least one optical circuit switch is to connect one of the active line cards to another of the active line cards.

18. The method of claim 11, wherein the reconfiguring is performed in response to addition of a line card to or removal of a line card from a slot of a network device.

19. The method of claim 11, wherein the establishing, the routing, and the reconfiguring are performed on a network device that includes the at least one optical circuit switch and slots for connecting to the removable line cards.

* * * * *